United States Patent [19]

Armer et al.

[11] Patent Number: 4,739,503

[45] Date of Patent: Apr. 19, 1988

[54] CARRY/BORROW PROPAGATE ADDER/SUBTRACTOR

[75] Inventors: John Armer, Middlesex; Erwin J. Wittmann, North Plainfield, both of N.J.

[73] Assignee: RCA Corporation, Princeton, N.J.

[21] Appl. No.: 853,854

[22] Filed: Apr. 21, 1986

[51] Int. Cl.⁴ .............................................. G06F 7/50
[52] U.S. Cl. ...................................................... 364/786
[58] Field of Search ........................................ 364/786

[56] References Cited

U.S. PATENT DOCUMENTS

| | | | |
|---|---|---|---|
| 4,357,675 | 11/1982 | Freyman | 364/786 |
| 4,439,835 | 3/1984 | Best et al. | 364/786 |
| 4,471,454 | 9/1984 | Dearden et al. | 364/786 |
| 4,523,292 | 6/1985 | Armer | 364/786 |
| 4,536,855 | 8/1985 | Morton | 364/786 |
| 4,563,751 | 1/1986 | Barker | 364/786 |
| 4,564,921 | 1/1986 | Suganuma | 364/784 |
| 4,685,079 | 8/1987 | Armer | 364/786 X |

OTHER PUBLICATIONS

N. H. E. Westz et al., "Principles of CMOS VLSI Design;" 1985; Addison-Wesley Pub. Co.; pp. 310–314.

Primary Examiner—David H. Malzahn
Attorney, Agent, or Firm—E. M. Whitacre; P. J. Rasmussen; E. P. Herrmann

[57] ABSTRACT

A digital arithmetic combiner having improved overflow signal propagation delay characteristics is disclosed. Such an arithmetic combiner includes a tristate device having a data input terminal coupled to an overflow input terminal and a data output terminal coupled to an overflow output terminal. A tristate control terminal is coupled to the output of logic circuitry. The logic circuitry is responsive to operand input signals and enables the tristate device to generate a signal at its data output terminal when the operand input signals have different logic states. In addition, an overflow generator is responsive to the operand input signals, and generates a signal indicating overflow conditions at the overflow output terminal when the operand input signals have the same logic state.

5 Claims, 4 Drawing Sheets

EXCLUSIVE OR

| X | Y | X excl OR Y |
|---|---|---|
| 0 | 0 | 0 |
| 0 | 1 | 1 |
| 1 | 0 | 1 |
| 1 | 1 | 0 |

CARRY/BORROW PROPAGATE ADDER/SUBTRACTOR

The present invention relates to a digital arithmetic combiner including overflow indication circuitry having improved performance.

Digital arithmetic combiners, such as adders and subtractors, are sometimes constructed to operate on digital words consisting of several binary digits (bits). Some such combiners are constructed to operate on all input bits of both operands in parallel. Such a combiner may be constructed of several stages, each of which combines one bit of each of the two operands to produce one bit of the result. In parallel-type combiners, an overflow indication must be supplied from one stage to the adjacent stage for all of the stages in the combiner before the result is correct. In parallel adders, for example, the overflow indications correspond to carry indications, and in parallel subtractors, the overflow indications correspond to borrow signals. The term overflow indication is used herein to refer to either a carry or borrow indication, depending upon whether the combiner is an adder or subtractor respectively. This overflow transmission scheme is called a ripple carry or ripple borrow respectively.

Because the result bit and output overflow indication from a particular stage are not valid until the overflow indication from the preceding stage is valid, the propagation delay of the overflow signals from the first stage to the last stage of the combiner is usually the limiting constraint on the speed of the adder. It is therefore desirable to minimize this propagation delay.

U.S. Pat. No. 4,523,292 entitled "Complementary FET Ripple Carry Binary Adder Circuit" issued June 11, 1985 to Armer illustrates one such adder. As described in this patent, the carry output signal for a binary adder stage depends upon the carry input signal and the two operand bits for that stage. If, for a particular stage, both operands are logic '1' signals, then the carry output signal is a logic '1' signal. If they are both logic '0' signals, then the carry output signal is a logic '0' signal. Otherwise, the carry output signal is the same as the carry input signal.

In the adder described in the above-mentioned patent, the carry input signal to a particular stage is a negative logic signal coupled to an inverting input of an exclusive OR gate. It is also coupled to a carry output terminal producing a negative logic signal through the primary conduction path of a field effect transistor (FET). Under the conditions when the carry output signal is supposed to be the same as the carry input signal, this FET transistor is made conductive. Otherwise, it is made nonconductive and the carry output signal is made a logic '1' or '0' signal, depending upon the operand inputs.

When conducting, an FET transistor, even though it is conductive, exhibits a significant impedance. Also, input connections to logic circuitry, for example exclusive OR gates, present a capacitive impedance. Under the condition where the carry input at the stage processing the least significant bit is passed, unchanged, through to the stage processing the most significant bit, many capacitive impedances (exclusive OR gates) occur in parallel. These capacitive impedances are driven through serially coupled, FET transistor conduction paths. This is, in effect, a low pass filter structure, and the rise time of the carry input to the stage processing the most significant bit will be lengthened, undesirably increasing the propagation delay time.

In accordance with the principles of the present invention, the propagation delay from the carry input of the first stage to that of the final stage in a multistage digital arithmetic combiner is decreased by minimizing both the capacitive load on, and the impedance through the propagation path of the overflow indication.

Apparatus according to the principles of the present invention includes a tristate device having a data input terminal coupled to an overflow input terminal, an output terminal coupled to an overflow output terminal, and a tristate control terminal. The tristate device includes first and second controlled switches having their control electrodes coupled to the data input terminal. An overflow generator has input terminals responsive to operand input signals and an output terminal coupled to the overflow output terminal. The overflow generator generates a signal indicating overflow conditions when the operand input signals have the same logic state. Logic circuitry is coupled between the operand input terminals and the tristate control terminal of the tristate device which enables the tristate device to generate a signal when the operand input signals have different logic states.

Figure 1:
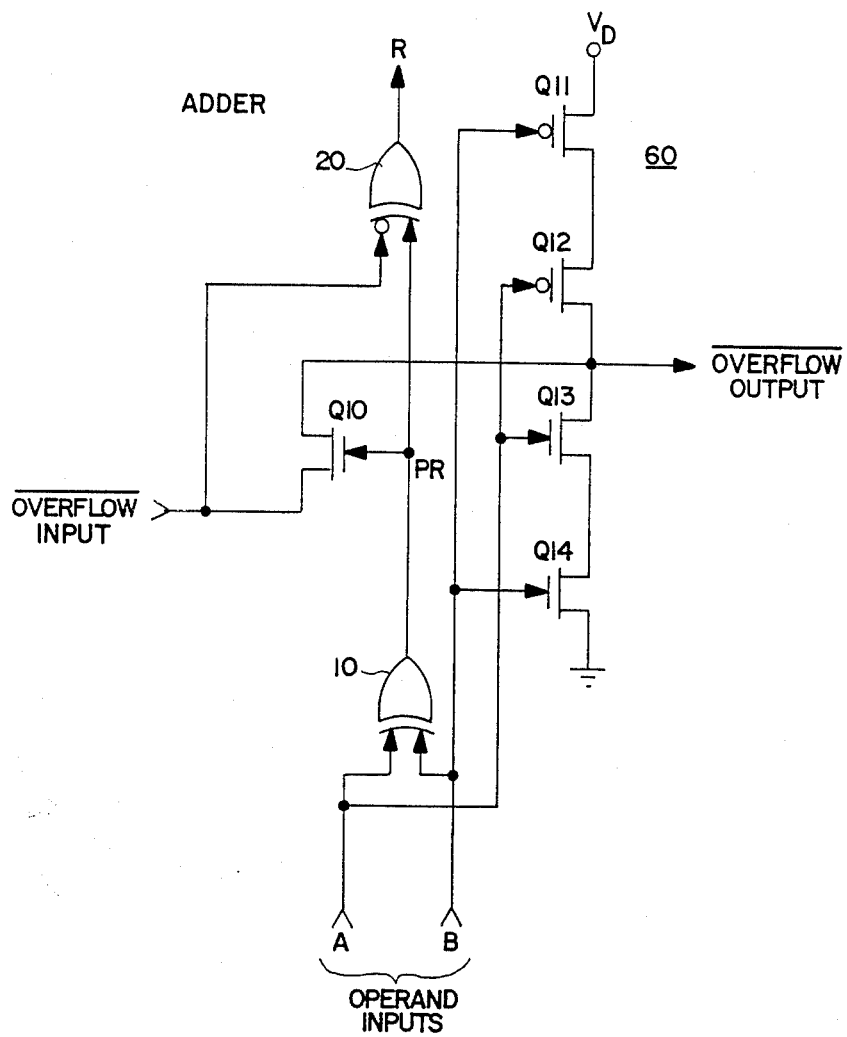
FIG. 1 is a circuit diagram of a prior art digital combiner stage partially in logic and partially in schematic form.

FIG. 1 illustrates one stage of a prior art parallel binary full adder. This stage processes two one bit operand input signals A and B, and a one-bit negative logic $\overline{\text{overflow input}}$ signal to produce a one bit result signal and a one-bit negative logic $\overline{\text{overflow output}}$ signal. Operand input terminals A and B are coupled to respective input terminals of an exclusive OR gate 10. The output terminal of exclusive OR gate 10 is coupled to an input terminal of exclusive OR gate 20. The $\overline{\text{overflow input}}$ terminal is coupled to a second, logic inverting, input terminal (as indicated by the small circle at its input) of exclusive OR gate 20. The output of exclusive OR gate 20 is coupled to the result output terminal R of the digital adder stage and represents the sum bit for this stage.

The $\overline{\text{overflow input}}$ terminal is also coupled to the $\overline{\text{overflow output}}$ terminal through the primary conduction path of transistor Q10. The gate electrode of transistor Q10 is coupled to the output of exclusive OR gate 10.

An overflow generator 60 is formed by transistors Q11 through Q14, having their primary conduction paths serially coupled between a source of voltage $V_D$ and a source of reference potential (ground). The junction of the primary conduction paths of transistors Q12 and Q13 is coupled to the $\overline{\text{overflow output}}$ terminal. Operand input terminal A is coupled to the gate electrodes of transistors Q12 and Q13, and operand input terminal B is coupled to the gate electrodes of transistors Q11 and Q14.

In operation, when operands A and B have different logic states, overflow generator 60 exhibits a high impedance output state. When both operands are either logic '1' or logic '0' signals, overflow generator 60 generates a logic '0' or logic '1' signal respectively.

Exclusive OR gate 10 produces a logic '1' signal whenever the operand input signals A and B have different states and produces a logic '0' signal otherwise. This signal, is coupled to the gate electrode of transistor Q10, which becomes conductive when a logic '1' signal (voltage $V_D$) is applied to its gate electrode and becomes nonconductive when a logic '0' signal (ground) is applied to its gate electrode. Transistor Q10, is thus made conductive whenever the operand input signals have different logic states and is made nonconductive otherwise.

The outputs of transistor Q10 and overflow generator 60 are, in effect, wire-ORed to the overflow output terminal. As a result, when the logic states of the operand input signals differ, the overflow output assumes the logic state of the overflow input. When the logic state of both operand input signals is a logic '1' then the overflow output signal is a logic '0' signal; if the logic state of both operand input signals is a logic '0', then the overflow output signal is a logic '1' signal.

Figure 2:
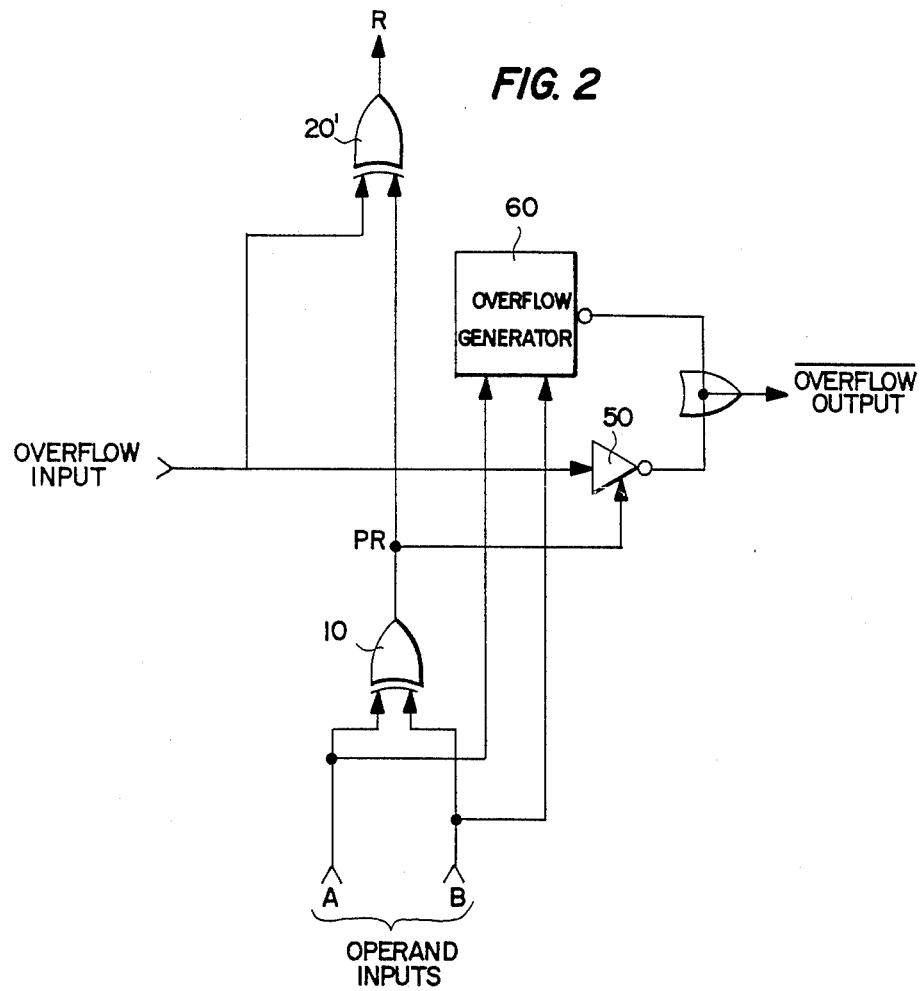
FIG. 2 is a circuit diagram of a digital combiner stage in accordance with the principles of the present invention partially in block and partially in logic form.

FIG. 2 illustrates an adder stage according to the principles of the present invention. Elements similar to those in FIG. 1 are designated by the same reference number and operate in a similar manner. The adder stage illustrated in FIG. 2 has an overflow input terminal for receiving a positive logic signal and has an overflow output terminal for producing a negative logic signal. Exclusive OR gate 10 has input terminals for receiving the operand input signals A and B and an output terminal producing a partial result signal PR. The overflow input terminal and the output terminal of exclusive OR gate 10 are coupled to respective input terminals of an exclusive OR gate 20'. The result signal R produced at an output terminal of exclusive OR gate 20' represents the sum.

An overflow generator circuit 60 which may be similar to the arrangement of transistors Q11 to Q14 illustrated in FIG. 1, produces the negative logic overflow output signal when operand input signals A and B have the same logic states.

A tristate inverter 50 has a data input terminal coupled to the overflow input terminal and a data output terminal coupled to the overflow output terminal. The tristate inverter 50 also has a tristate control input terminal coupled to the output of exclusive OR gate 10. The outputs of the overflow generator 60 and tristate inverter 50 are wire-ORed at the overflow output terminal.

As described above, overflow generator 60 produces at its output terminal a signal which is a logic '0' signal when both operand input signals are logic '1' signals and produces a logic '1' signal when both operand input signals are logic '0' signals. When the operand input signals do not have the same state, then the signal at the output terminal of overflow generator 60 exhibits a high impedance state, and thus does not affect the overflow output signal.

Exclusive OR gate 10 produces a logic '1' signal whenever the operand input signals have different logic states, as described above. This logic '1' signal when applied to the tristate control input terminal enables tristate inverter 50 to pass the logic inverse of the overflow input signal present on the overflow input terminal to the overflow output terminal. When the operand input terminals have the same logic state, the output of exclusive OR gate 10 is a logic '0' signal, which conditions the tristate inverter 50 to exhibit a high impedance output state. Only one of the overflow generator circuit 60 or the overflow propagate circuit 50 is operative at any one time in response to particular operand inputs A and B.

The overflow input signal is not passed through any primary conduction path of a transistor, as is the case in the adder stage illustrated in FIG. 1. The rise time of the overflow input signal propagated through to the final stage will, thus, be faster and become valid sooner than in the prior art adder stages.

A simplification of the adder stage illustrated in FIG. 2 may be attained by utilizing a particular exclusive OR gate known in the prior art. U.S. Pat. No. 3,500,062 entitled "Digital Logic Apparatus" issued Mar. 10, 1970 to J. E. Annis describes an exclusive OR circuit arrangement illustrated in FIG. 3 of the present application. In the exclusive OR gate illustrated in FIG. 3, transistors Q33 and Q34 form a transmission gate coupled between input terminal Y and the result terminal. The gate electrode of transistor Q33 is coupled to input terminal X, and the gate electrode of transistor Q34 is coupled to input terminal X through an inverter formed by transistors Q31 and Q32 which generates the signal $\overline{X}$. Further transistors Q35 and Q36 are arranged in an inverter configuration coupled between input terminal Y and the result terminal.

In operation, when the signal at input terminal X is a logic '0' signal, FET transistors Q33 and Q34 are enabled as a transmission gate to pass the signal from input terminal Y directly to the result terminal of the exclusive OR gate 20'. The inverter formed by FET transistors Q35 and Q36 is disabled. When the input signal at terminal X is a logic '1' signal, the transmission gate formed by FET transistors Q33 and Q34 is disabled, but FET transistors Q35 and Q36 are enabled to operate as an inverter. The result signal in this case is the inverse of input signal Y. The truth table in FIG. 3 illustrates the logic function of the exclusive OR gate illustrated in FIG. 3.

Figure 3:
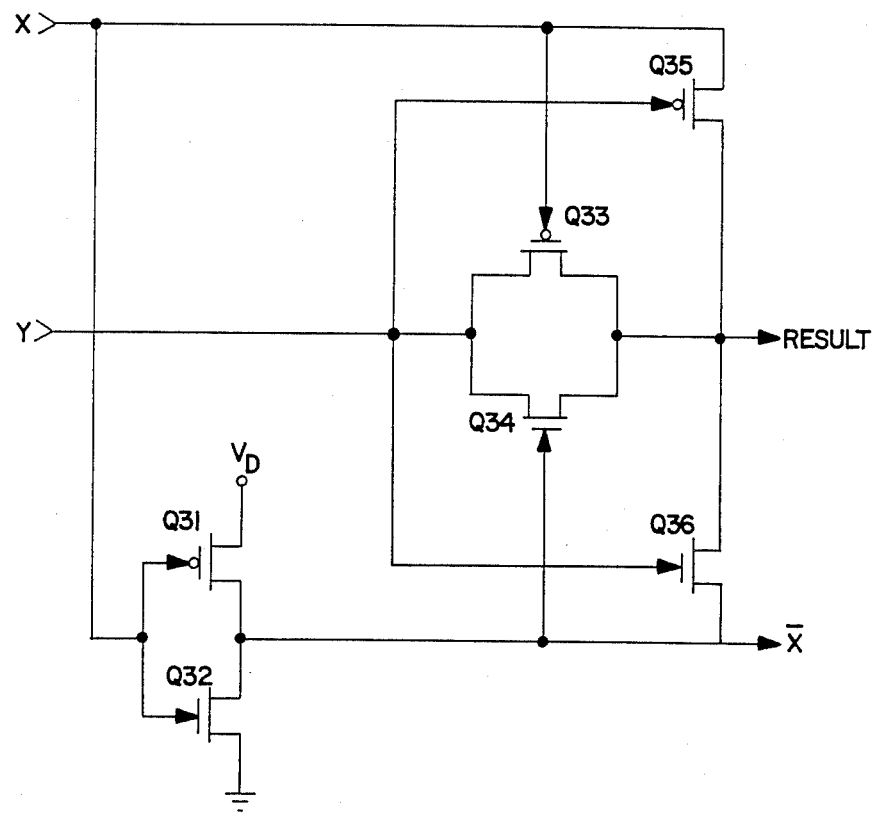
FIG. 3 is a schematic circuit diagram of a prior art exclusive OR gate (including a truth table) which may be used in the digital combiner stages illustrated in FIGS. 2 and 4.
Figure 4:
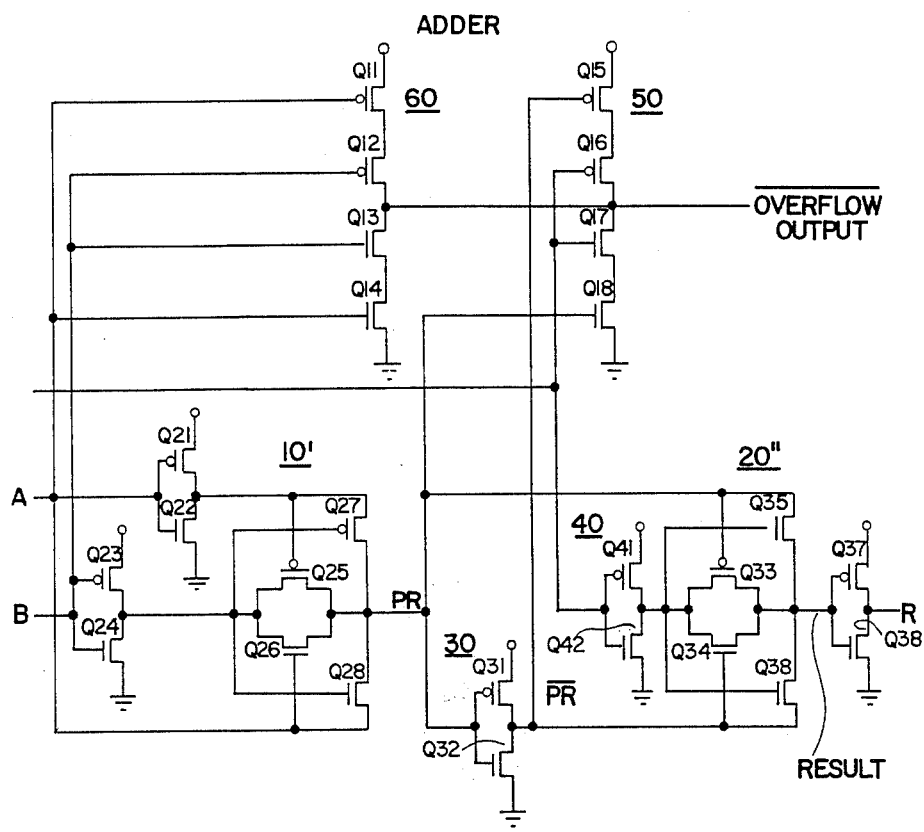
FIG. 4 is a schematic circuit diagram of a digital combiner stage also in accordance with the principles of the present invention.

FIG. 4 illustrates a schematic diagram of an adder stage utilizing an exclusive OR circuit similar to that shown in FIG. 3. Operand inputs A and B are applied to an exclusive OR gate 10' formed by transistors Q21 through Q28. The inverter formed by transistors Q23 and Q24 in the operand B signal path provides drive capability for the transmission gate formed by transistors Q25 and Q26. To maintain the exclusive OR function, a logic inversion must also be performed in the operand A signal path. An inverter formed by transistors Q21 and Q22 is coupled between the operand A input terminal and the control electrode of transistor Q25, and operand A input terminal is coupled directly to the control electrode of transistor Q26. The output of exclusive OR gate 10' is the partial result signal PR.

The partial result signal PR and the carry input signal are coupled to inputs of exclusive OR gate 20" formed by transistors Q31 through Q38. The inverter formed by transistors Q41 and Q42 provides the minimum load on the carry input terminal and provides drive capability for the transmission gate formed by transistors Q33 and Q34, but performs a logic inversion. The signal generated at the junction of the primary conduction paths of transistors Q35 and Q36 thus represents the exclusive NOR function of the input operands. The inverter formed by transistors Q37 and Q38 provides the logic inversion to generate an exclusive OR function and provides drive capability for the circuitry coupled to the result output terminal.

Overflow generator circuitry 60 is formed by transistors Q11 through Q14 as illustrated in FIG. 1. Overflow propagate circuitry 50 is formed by transistors Q15 through Q18. Transistors Q15 to Q18 and inverter 30 form a tristate inverter. The partial result PR, and its complement $\overline{PR}$ developed by inverter 30, are coupled to the gate electrodes of complementary transistors Q18 and Q15 respectively. When the partial result PR is a logic '1', transistor Q15 and Q18 are both conditioned to conduct enabling complementary transistors Q16 and Q17 to operate as an inverter. Conversely, when the partial result PR is a logic '0', transistors Q15 and Q18 are both conditioned not to conduct, effectively disconnecting the inverter formed by complementary transistors Q16 and Q17 from the circuit. Therefore, when the partial result is a logic '0', circuitry 50 exhibits a high impedance output at the interconnection of transistors Q16 and Q17 and exhibits the complement (inverse) of the overflow input when the partial result is a logic '1'.

The adder stage illustrated in FIG. 4 minimizes the propagation time for the overflow signals from the stage processing the least significant bit to the stage processing the most significant bit, as discussed above.

Subtractor stages, including ripple borrow circuitry, may be constructed according to the principles of the present invention. For example, the circuitry of FIG. 4 may be converted to a subtractor stage by coupling the gate electrodes of transistors Q12 and Q13 to the output of the inverter formed by transistors Q23 and Q24. In addition, the gate electrode of transistor Q15 in the overflow propagate circuitry 50 is coupled directly to the partial result PR terminal, and the gate electrode of transistor Q18 is coupled to the complement $\overline{PR}$ of the partial result.

Although adder and subtractor stages have been described in detail having a positive logic overflow input signal and a negative logic overflow output signal, combiner stages having a negative logic overflow input signal and a positive logic overflow output signal may also be constructed according to the principles of the present invention. In this instance, the gate electrodes of transistors Q11 through Q14 in the overflow generate circuitry 60 are made responsive to the logic inverse of the normal logic state operand input signals, and the exclusive OR gate 20" of FIG. 4 is replaced by an exclusive NOR gate.

What is claimed is:

1. A digital arithmetic combiner, comprising:
respective overflow input and output terminals;
respective operand input terminals;
a tristate device having a data input terminal coupled to said overflow input terminal, a data output terminal coupled to said overflow output terminal, and a tristate control terminal, and including first and second controlled switches having control electrodes coupled to said tristate control terminal and having primary conduction paths serially coupled between a source of operating potential and a source of reference potential;
an overflow generator having respective input terminals coupled to said operand input terminals, and an output terminal coupled to said overflow output terminal, for generating a signal indicating overflow conditions when the signals at said operand input terminals have the same logic states; and
logic circuitry coupled between said operand input terminals and said tristate control terminal for enabling said tristate device to generate a signal at said data output terminal when the signals at said operand input terminals have different logic states.

2. The combiner of claim 1, wherein:
said overflow generator produces at said output terminal a signal having a first state when said operand input signals are both logic '1' signals, and a second state when said operand input signals are both logic '0' signals; and
said tristate device is operative when said operand input signals have different logic states to produce at said data output terminal a signal having a first state when the signal at said overflow input terminal is a logic '1' signal and a second state when said overflow input signal is a logic '0' signal.

3. The combiner of claim 2, wherein said logic circuitry comprises an exclusive OR gate having respective input terminals coupled to said operand input terminals and an output terminal coupled to said tristate control input.

4. The combiner of claim 3, wherein said tristate device comprises:
a serial connection of the primary conduction paths of said first controlled switch and a third controlled switch between said overflow output terminal and a source of supply corresponding to said first state, wherein the control electrode of said third controlled switch is coupled to said output terminal of said exclusive OR gate; and
a serial connection of the primary conduction paths of said second controlled switch and a fourth controlled switch between said overflow output terminal and a source of supply corresponding to said second state, wherein the control electrode of said fourth controlled switch is coupled to said output terminal of said exclusive OR gate.

5. A digital arithmetic combiner, comprising:
respective overflow input and output terminals;
respective operand input terminals;
a tristate inverter having a data input coupled to said overflow input terminal, a data output coupled to said overflow output terminal, and a tristate control input terminal;
an overflow generator having respective input terminals coupled to said operand input terminals, and an output terminal coupled to said overflow output terminal, for generating a signal indicating overflow conditions when the signals at said operand input terminals have the same logic state; and
logic circuitry coupled between said operand input terminals and said tristate control input terminal for enabling said tristate inverter to generate a signal at said data output terminal when the signals at said operand input terminals have different logic states.

* * * * *